United States Patent [19]

Vollmann

[11] Patent Number: 5,267,706
[45] Date of Patent: Dec. 7, 1993

[54] APPARATUS HAVING A COMPACT MECHANISM FOR MOVINGS THE SLIDING COVER OF A CASSETTE

[75] Inventor: Nobert C. Vollmann, Eindhoven, Netherlands

[73] Assignee: U.S. Philips Corporation, New York, N.Y.

[21] Appl. No.: 816,208

[22] Filed: Jan. 2, 1992

[30] Foreign Application Priority Data

Feb. 8, 1991 [NL] Netherlands ......................... 9100222

[51] Int. Cl.[5] .................... G11B 15/66; G11B 15/60
[52] U.S. Cl. .................................. 242/198; 360/99.06
[58] Field of Search .............. 242/198; 360/96.5, 96.6, 360/99.02, 99.03, 99.06, 99.07

[56] References Cited

U.S. PATENT DOCUMENTS

| | | | |
|---|---|---|---|
| 4,546,397 | 10/1985 | Asami et al. | 360/99.02 |
| 4,811,137 | 3/1989 | Muto et al. | 360/99.06 |
| 4,899,238 | 2/1990 | Inoue et al. | 360/99.06 |
| 5,111,350 | 5/1992 | Carey et al. | 360/99.06 |
| 5,153,867 | 10/1992 | Inoue | 360/99.06 |

*Primary Examiner*—Daniel P. Stodola
*Assistant Examiner*—John Q. Nguyen
*Attorney, Agent, or Firm*—Brian J. Wieghaus

[57] ABSTRACT

An apparatus (1) suitable for cooperation with a cassette (9). The cassette comprises a sliding cover (41) which is movable between a rest position and an operating position. The apparatus comprises a cassette holder (7) with an urging member (73) for moving the sliding cover relative to the housing (13) of the cassette. The urging member comprises a sheet member (83) having the shape of a circular segment and having an arcuate edge (85) provided with teeth (97). The sheet member has secured to it a spindle (75) and an arm (87) carrying a pin (81) for moving the sliding cover. The cassette holder has a slot (77) in which the spindle is movable and a toothed rack (95) which is in mesh with the arcuate edge of the sheet member.

20 Claims, 5 Drawing Sheets

APPARATUS HAVING A COMPACT MECHANISM FOR MOVINGS THE SLIDING COVER OF A CASSETTE

BACKGROUND OF THE INVENTION

The invention relates to an apparatus for cooperation with a cassette provided with magnetic tape, which cassette comprises a housing and a sliding cover which is movable over the housing between a rest position and an operating position, which apparatus comprises a cassette holder and urging means for moving the sliding cover, which urging means have a pivot about which the urging means are pivotable.

Such an apparatus is described in Netherlands Patent Application number 9000348 (herewith incorporated by reference), which has not been published prior to the date of the present Application. Said prior Application describes a system comprising said apparatus and a cassette for recording and/or reproducing digital audio signals on/from the magnetic tape in the cassette. This system is to supersede the well-known Compact Cassette system in accordance with the international standard IEC 94-7, in which the signals are read and written from/on the magnetic tape in analog form. the urging means of the apparatus described comprise an arm having one end carrying a pin for moving the sliding cover and having another end pivotally connected to the apparatus. A drawback of said urging means is that they occupy much space in the apparatus. Since the angle at which the arm is inclined relative to the direction of insertion of the cassette should not be too small, because in the case of too small an angle the friction between the pin and the cassette will be too large to move the pin past the cassette, and since the sliding cover has to be moved over a large distance in a direction perpendicular to the direction of insertion the arm should be long and the pivot should be situated far outwards, which requires a substantial mounting volume.

OBJECTIVES AND SUMMARY OF THE INVENTION

It is an object of the invention to provide an apparatus requiring a minimal mounting volume for the urging means for moving the sliding cover. To this end the apparatus in accordance with the invention is characterised in that the cassette holder comprises guide means carrying the urging means at the location of the pivot, and the urging means comprise an element for moving the pivot over the guide means. During the movement of the sliding cover the urging means are pivoted about the pivot and the element moves the pivot along the guide means. As the pivot formed by the spindle is moved in the same direction as that in which the sliding cover is to be moved the required displacement of the sliding cover can be obtained with urging means of small dimensions.

An embodiment of the apparatus in accordance with the invention, in which the urging means comprise an arm and a pin arranged on the arm for moving the sliding cover and in which a cassette can be inserted into the cassette holder in a direction of insertion, the direction of insertion and the arm extending at an angle relative to one another, is characterised in that the angle is larger than 30°. With an angle larger than 30° the frictional force between the pin and the cassette in a direction perpendicular to the direction of insertion is substantially smaller than the component in the direction perpendicular to the direction of insertion of the force exerted on the pin during insertion of the cassette. Thus, the urging means for opening the sliding cover can be moved during insertion of the cassette without a substantial effort being exerted on the cassette.

A further embodiment of the apparatus in accordance with the invention is characterised in that the element comprises a sheet member having an arcuate edge provided with teeth, the pivot taking the form of a spindle secured to the sheet member, the cassette holder comprises a toothed rack which is in mesh with the arcuate edge of the sheet member, and the cassette holder has a slot engaged by the spindle, a part of the bounding wall of the slot constituting the guide means carrying the spindle. Insertion of the cassette causes the sliding cover to be moved and the arm to be pivoted about the spindle. The pivotal movement of the arm about the spindle causes the sheet member to be pivoted likewise. As a result of this, the sheet member travels over the toothed rack, causing the spindle to move through the slot. Thus, a force causing the spindle to be moved is transmitted between the toothed rack and the sheet member. A small pivotal movement of the arm then results in a large movement of the spindle. By means of this construction the required displacement of the sliding cover can be obtained with a large initial angle between the arm and the direction of insertion whereas only a small mounting volume is required. For a correct operation of the urging means the urging means should be supported by the guide means, which in the present case takes the form of the bounding wall of the slot, and the component of the force exerted on the urging means by the toothed rack and having the same direction as the force exerted on the urging means by the guide means should not be so large that it would cause the spindle to be lifted off the guide means. If the spindle should be clear of the guide means the spindle will no longer function as a pivot but the contact point between the sheet member and the toothed rack will function as the pivot, thereby undoing the advantages of the present construction. Another advantage of this construction is that the urging means can be constructed as an integral unit, enabling these urging means to be manufactured and mounted in the apparatus simply and cheaply.

Still another embodiment of the apparatus in accordance with the invention is characterised in that the sheet member has the shape of an arc of circle having a centre, the spindle is secured to the sheet member at the location of the centre of the circle, and the toothed rack is straight. A sheet member having the shape of a circular segment and a straight toothed rack have the advantage that they can be constructed and manufactured simply.

Yet another embodiment of the apparatus in accordance with the invention is characterised in that a spring has one end secured to the urging means at the location of the pivot and has its other end secured to the cassette holder. In this way it is achieved that the urging means resume their initial position during removal of the cassette from the cassette holder.

BRIEF DESCRIPTION OF THE DRAWING

The invention will be described in more detail hereinafter, by way of example, on the basis of an embodiment of the apparatus in accordance with the invention shown in the drawings. In the drawings.

DESCRIPTION OF THE PREFERRED EMBODIMENT

Figure 1:
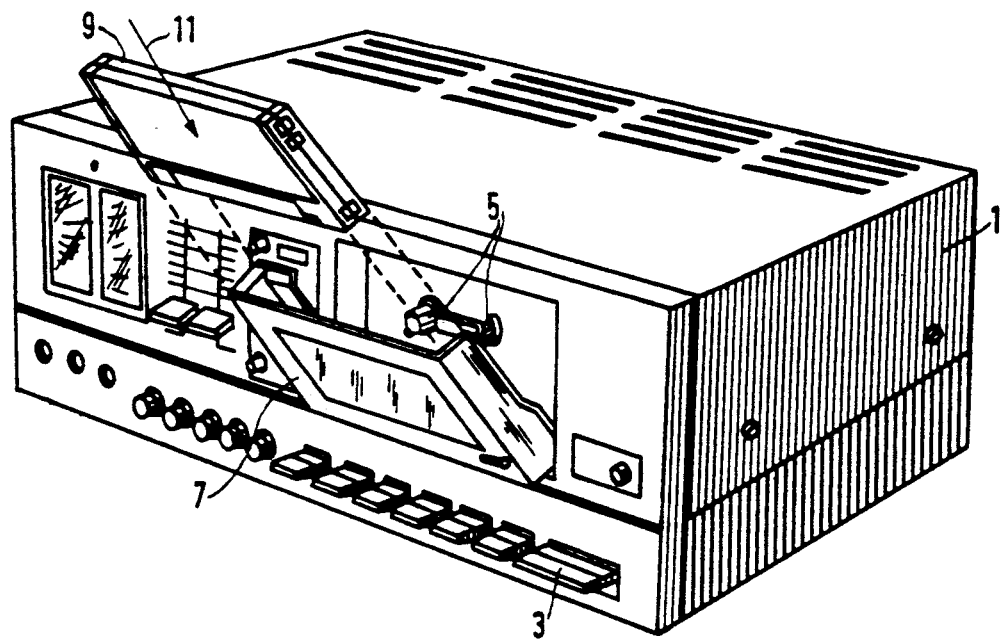
FIG. 1 shows an embodiment of an apparatus in accordance with the invention.

FIG. 1 shows an embodiment of the apparatus 1 in accordance with the invention. The apparatus 1 has controls 3, drive spindles 5 for rotating reels in a cassette, magnetic-head means (not shown) for recording and reproducing signals on/from magnetic tape, and a cassette holder 7. For the insertion of a cassette the cassette holder 7 is swung out of the apparatus 1 so that a cassette 9 can be inserted into the cassette holder in the direction of insertion 11. The apparatus is suitable for cooperation with a well-known Compact Cassette and a recently proposed digital cassette as described in the Netherlands Patent Application number 9000348 (herewith incorporated by reference), which has not been published prior to the date of the present Application. The apparatus comprises suitable magnetic-head means and suitable signal-processing means, as known from EP-A-381,266 (which corresponds to U.S. application Ser. No. 919,507 filed Jul. 24, 1992 of Johannes C. Muller and Abraham Hoogendoorn herewith incorporated by reference). The digital cassette has a sliding cover for closing openings in the housing of the cassette. In order to enable signals to be read from or written on the magnetic tape in the cassette the sliding cover should first be moved to an operating position.

Figure 2:
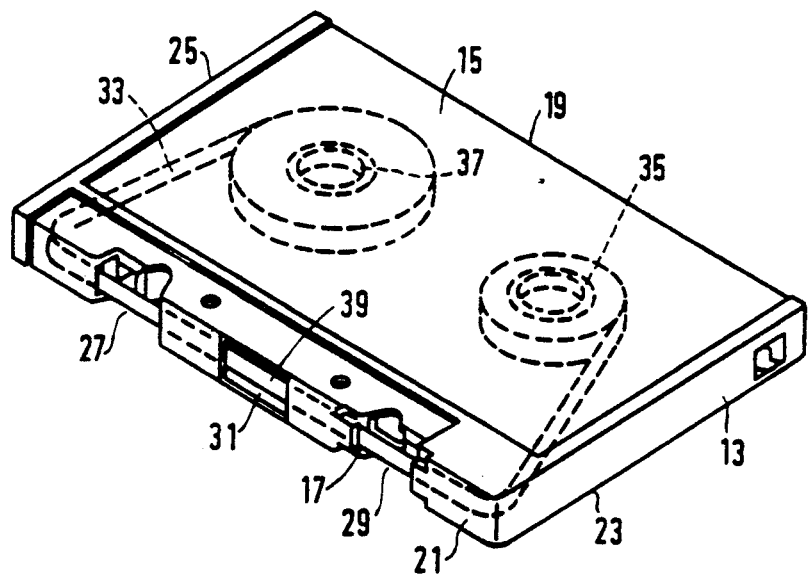
FIG. 2 is a perspective plan view of a housing of a known cassette.
Figure 3:
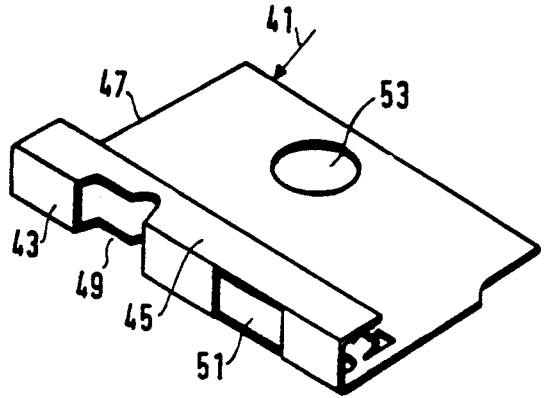
FIG. 3 is a perspective view of known sliding cover.
Figure 4:
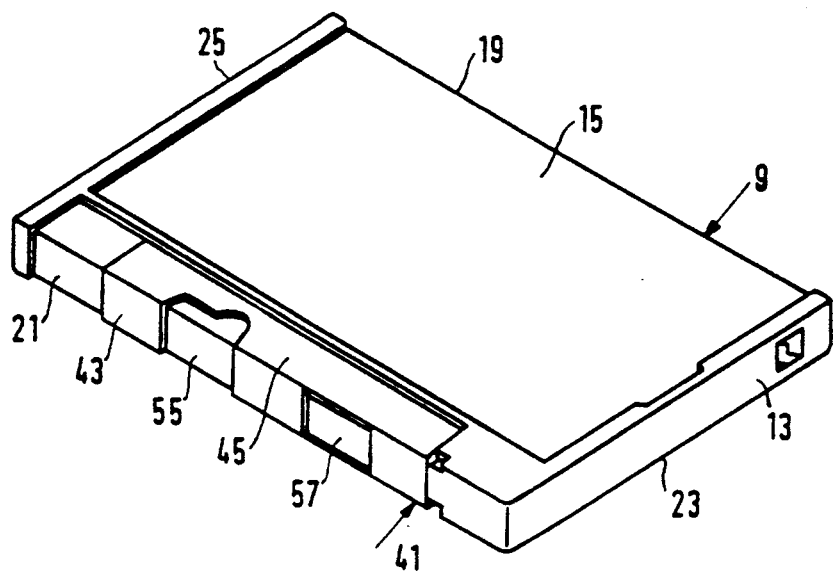
FIG. 4 is a perspective view similar to FIG. 2 but now showing the sliding cover of FIG. 3 mounted on the housing.

FIGS. 2, 3 and 4 show an example of the digital cassette. FIG. 2 shows a housing 13 of the cassette 9 with two parallel main walls 15, 17 and several transverse walls 19, 21, 23, 25. The transverse wall 21 constitutes a front wall with pressure-roller openings 27, 29 and a magnetic-head opening 31. The housing 13 accommodates a magnetic tape 33 wound on reels 35 and 37 and extending partly along openings 27, 29 and 31 formed in the front wall 21. The main wall 15 is substantially imperforate and near the front wall 21 it has pressure-roller openings for the passage of pressure rollers and capstans during cooperation with the apparatus 1, which openings extend into the main walls. The openings in the housing 13 can be closed by means of a sliding cover 41 shown in FIG. 3. For this purpose the sliding cover 41 comprises a front portion 43 extending parallel to the front wall 21 and two main portions 45, 47 which extend parallel to the main wall 15, 17 and which cover the openings in a rest position of the sliding cover (FIG. 4). In an operating position (not shown) of the sliding cover a pressure-roller opening 49, a magnetic-head opening 51 and a drive opening 53 in the sliding cover 41 expose the openings in the housing. FIG. 4 shows the cassette 9 with the sliding cover 41 mounted on the housing 13 in its rest position. The front portion 43 covers the openings 27, 29 and 31 in the front wall 21 of the housing 13. In the rest position the openings 49 and 51 face imperforate wall portions 55 and 57 of the front wall 21.

Figure 5:
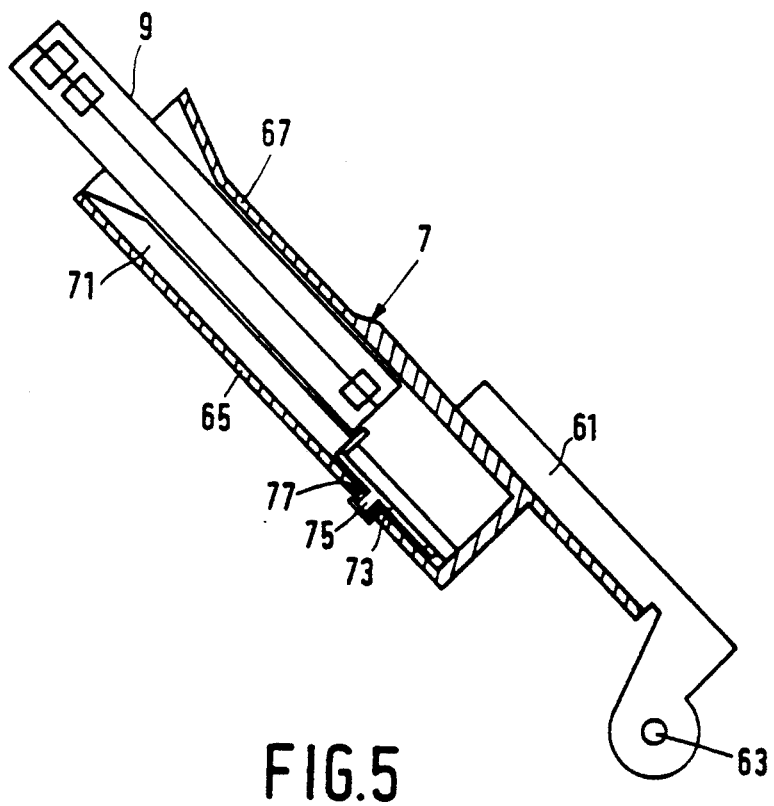
FIG. 5 is a cross-sectional view of a cassette holder of the apparatus.

FIG. 5 is a cross-sectional view of the cassette holder 7 with a partly inserted digital cassette 9. The cassette holder 7 is connected to the apparatus by an arm 61. The arm 61 is pivotable about a spindle 63 which is secured to the apparatus. At the front the cassette holder 7 comprises a substantially imperforate wall 65 and at the rear it comprises two cassette guides 67 and 69 (see also FIG. 6). Opposite these cassette guides two further cassette guides 71, secured to the wall 65, are situated. For opening the sliding cover 41 urging means 73 are arranged in the cassette holder near the wall 65. The urging means 73 comprise a spindle 75 which is movable in a slot 77 formed in the wall 65 and which functions as a pivot. A bounding wall 78 of the slot 77 guides the spindle 75 and carries the urging means 73.

Figure 6:
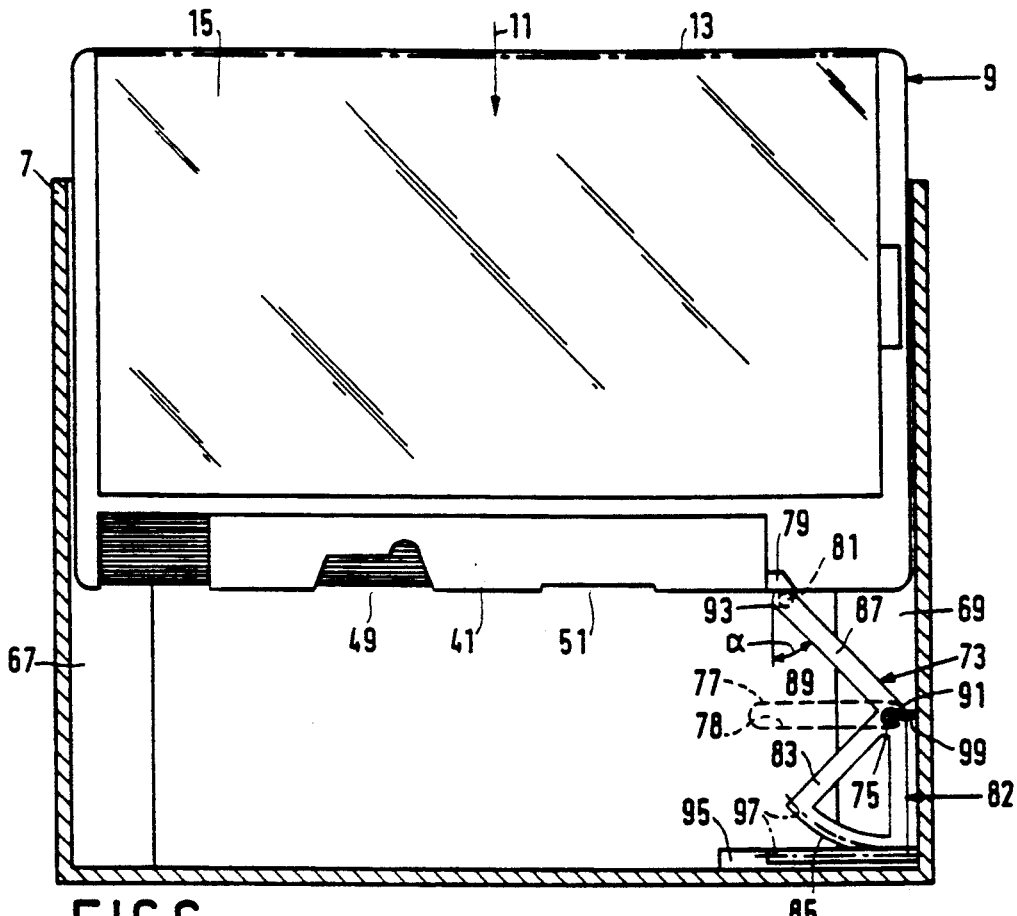
FIG. 6 is a longitudinal sectional view of the cassette holder provided with urging means and with a partly inserted digital cassette.
Figure 7:
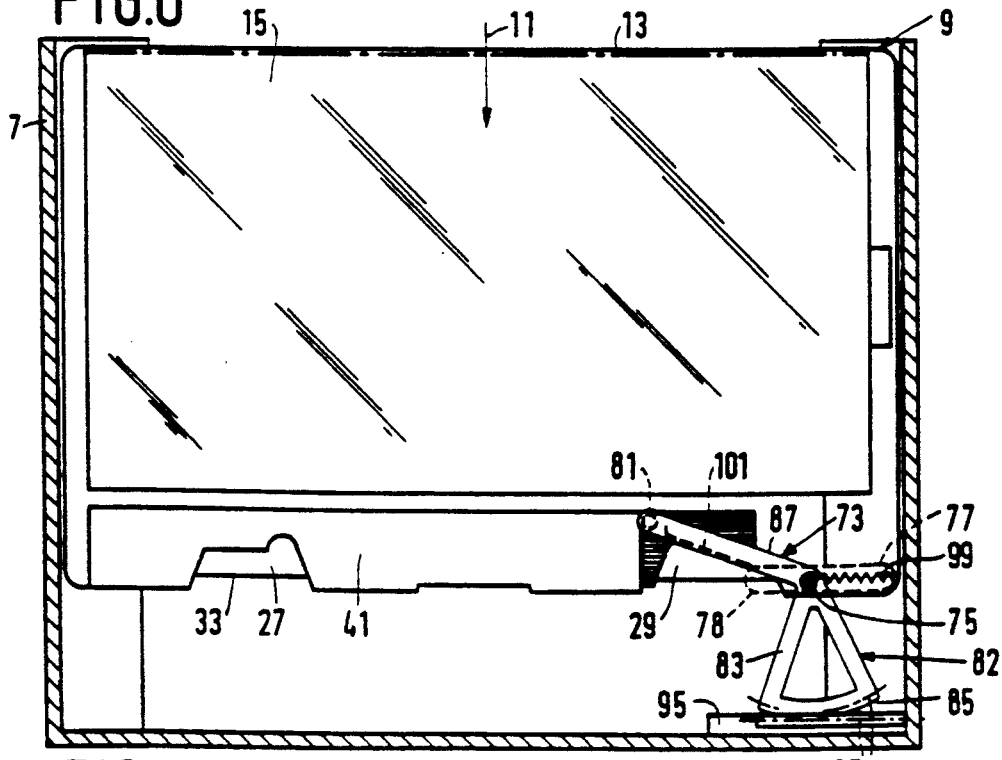
FIG. 7 is a longitudinal sectional view of the cassette holder with the digital cassette wholly inserted.

The operation and construction of these urging means 73 will be clarified by means of FIGS. 6 and 7. FIG. 6 illustrates the situation in which the digital cassette 9 has been inserted partly in the cassette holder 7. The cassette holder 7 is shown in a sectional view taken directly behind the wall 65 and the cassette guides 71 are not shown. A broken line indicates the location of the slot 77 in the wall 65. In this situation the cassette 9 does not yet cooperate with the urging means 73, so that the sliding cover 41 is in the rest position and the pressure-roller opening 49 and the magnetic-head opening 51 face imperforate wall portions of the housing 13. The cassette 9 has a recess 79 for receiving a pin 81 which forms part of the urging means 73. The urging means, or member comprise an element 82 constituted by a sheet member 83 having the shape of a circular segment and comprising an arcuate edge 85 and an arm 87 having an end 89 secured to the sheet member 83 at the location of the centre 91 of the circle defining the circular segment and having the pin 81 secured to it near another end 93. The direction of insertion 11 and the arm 87 are inclined at an angle $\alpha$ relative to one another. This angle $\alpha$ should not be too small because otherwise the frictional force between the pin 81 and the cassette 9 becomes larger than the component, directed perpendicularly to the direction of insertion 11, of the force exerted on the pin 81 by the cassette 9, so that the arm 87 is not pivoted and blocks further entry of the cassette 9. In the present example the angle $\alpha$ is 35°. In the cassette holder 7 a toothed rack 95 is situated which, like the edge 85, has teeth 97 over which the sheet member 83 can travel. During this travel the spindle 75 moves through the slot 77. During removal of the cassette 9 from the cassette holder 7 a spring 99, which as one end connected to the spindle 75 and another end to the cassette holder 7, returns the urging means 73 to the initial position illustrated in FIG. 6.

FIG. 7 illustrates the situation in which the sliding cover 41 is in the operating position and the pressure-roller openings 27, 29 and the magnetic-head opening in the housing 13 are exposed by the openings in the sliding cover. In this situation magnetic-head means and tape-transport means (not shown) of the apparatus can cooperate with the magnetic tape 33 in the housing 13. During insertion of the cassette 9 the pin 81 has moved along a guide profile 101 of the cassette and the arm 87 has pivoted about the spindle 75. Since the arm is pivoted the sheet member 83 is also pivoted about the spindle 75 during insertion of the cassette, as a result of which the edge 85 has moved over the toothed rack 95 and the spindle 75 has moved in the slot 77.

Figure 8:
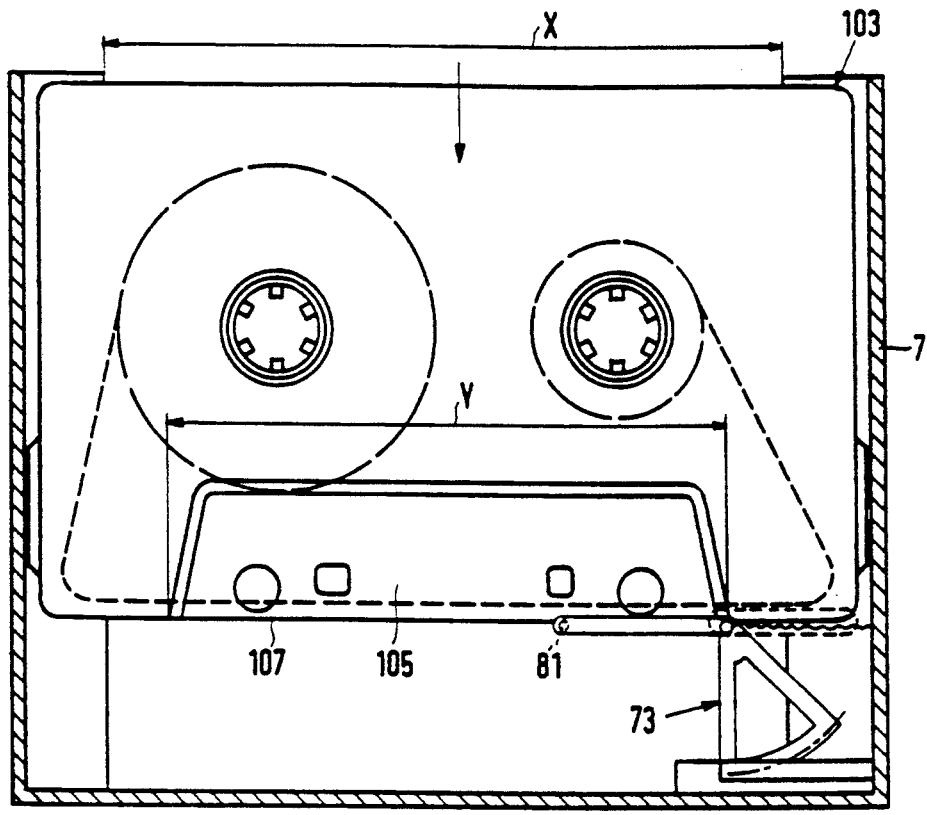
FIG. 8 is a longitudinal sectional view of the cassette holder with a wholly inserted analog cassette.

The apparatus is also suitable for cooperation with a Compact Cassette. FIG. 8 shows the cassette holder 7 containing a Compact Cassette 103. The Compact Cassette has a thicker portion 105 which does not fit between the facing cassette guides 67 and 71 (see FIG. 5). Therefore, the facing cassette-guide pairs are spaced at a distance X from one another. This distance X should be larger than the dimension Y of the thicker portion 105 of the Compact Cassette 103. The pin 81 of the urging means 73 can slide freely along the front wall 107 of the Compact Cassette 103 to allow insertion of the Compact cassette. The position of the urging means makes it possible to detect whether a Compact Cassette 103 or a digital cassette 9 has been inserted into the apparatus.

Figure 9:
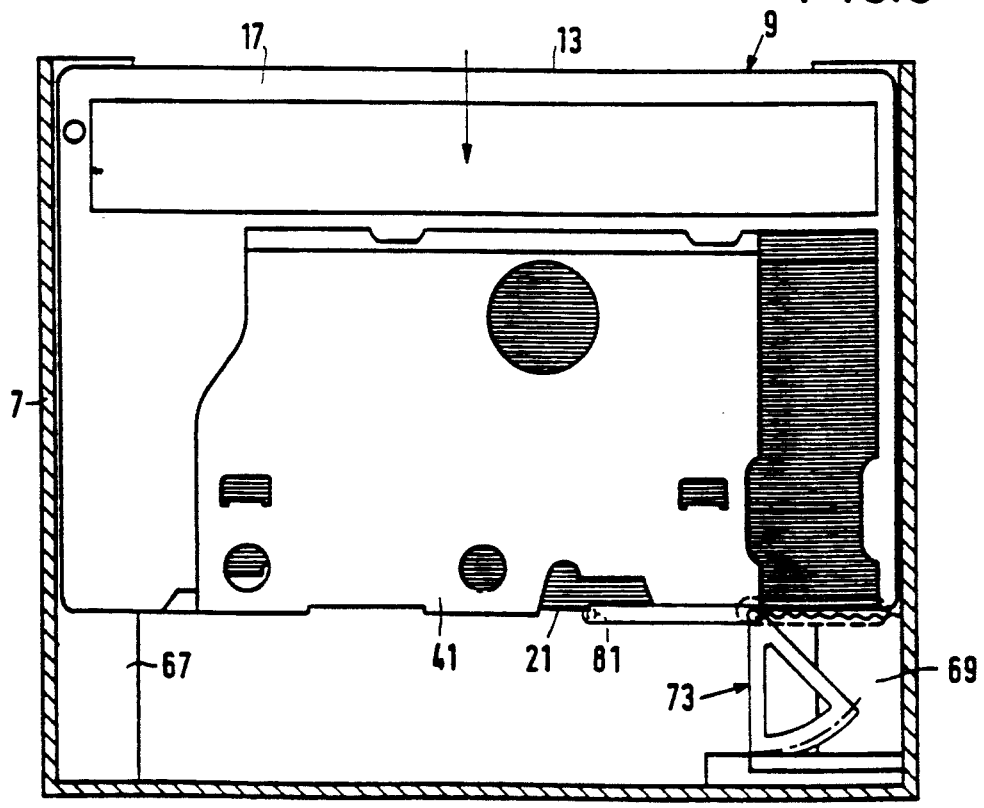
FIG. 9 is a longitudinal sectional view of the cassette holder with the digital cassette inserted incorrectly.

Finally, FIG. 9 illustrates the situation in which the digital cassette 9 has been misinserted. The cassette 9 has been inserted into the cassette holder with the wrong main wall 17 facing away from the cassette guides 67, 69. The pin 81 of the urging means 73 has then slid past the front wall 21 of the cassette 9 without having moved the sliding cover 41. As a result of this, the openings in the housing of the cassette 9 are still covered by the sliding cover 41, so that the apparatus cannot cooperate with the cassette.

Figure 10:
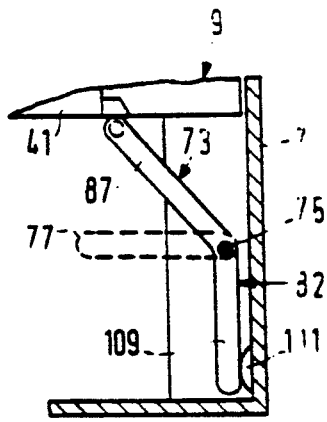
FIG. 10 shows a further example of the urging means of the apparatus in an initial position.
Figure 11:
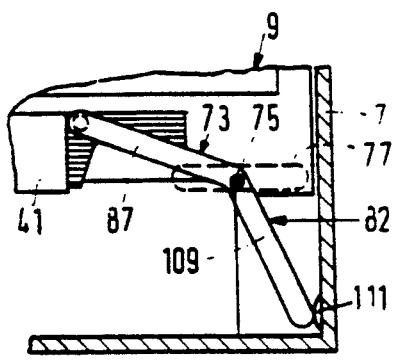
FIG. 11 shows the urging means of FIG. 10 in a final position.
Figure 12:
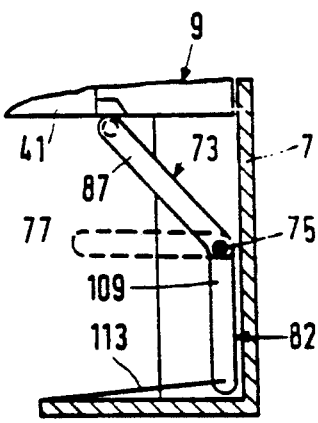
FIG. 12 shows another example of the urging means of the apparatus in an initial position.
Figure 13:
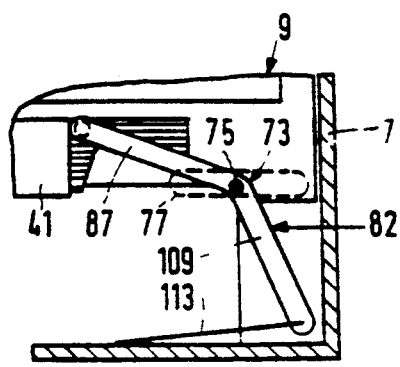
FIG. 13 shows the urging means of FIG. 12 in a final position.

It is to be noted that the invention should not be assumed to be limited to the embodiment of the apparatus in accordance with the invention shown in the Figures. Other constructions of the urging means are possible within the scope of the Claims. For example, instead of a sheet member 83 shaped as a circular segment, it is possible to construct the element 82 of the urging means 73 as a further arm 109, see FIG. 10, having one end which is in contact with a stop 111 on the cassette holder 7. During the pivotal movement of the urging means 73, see FIG. 11, the further arm 109 then abuts against the stop 111 and thus moves the spindle 75 in the slot 77. Instead of the use of a stop it is alternatively possible to connect the free end of the further arm 109 to a point on the cassette holder 7 via a flexible cord 113, see FIGS. 12 and 13. Moreover, the toothed rack, the sheet member and, if required, the guide means can be given another construction than shown herein. Instead of the spring 99 a blade spring may be used which lies against the pin 81 to exert a spring load on this pin.

I claim:

1. An apparatus for cooperation with a cassette having a housing and a sliding cover which is movable on the housing between a rest position and an operating position, which apparatus comprises a cassette holder for receiving a cassette in a direction of insertion and urging means for moving the sliding cover between its rest and operating positions during insertion of the cassette into the holder, which urging means has a pivot about which the urging means is pivotable, characterised in that:

the cassette holder comprises guide means extending only substantially linearly and only substantially transversely to the direction of insertion of the cassette for slidably guiding the pivot, and the urging means comprises an element for sliding the pivot along the guide means during insertion of the cassette into the holder.

2. An apparatus as claimed in claim 1, characterized in that the urging means comprises an arm and a pin arranged on the arm for moving the sliding cover, the arm extending at an angle larger than 30° relative to the direction of insertion.

3. An apparatus as claimed in claim 2, characterized in that the element comprises a sheet member having an arcuate edge provided with teeth, the pivot consisting of a spindle secured to the sheet member, the cassette holder comprises a toothed rack which is in mesh with the arcuate edge of the sheet member, and the cassette holder has a slot engaged by the spindle, a part of the bounding wall of the slot constituting the guide means carrying the spindle.

4. An apparatus as claimed in claim 2, further comprising a spring having one end secured to the urging means at the location of the pivot and has its other end secured to the cassette holder for returning the urging means, upon removal of the cassette from the holder, in the direction opposite the direction of urging of the sliding cover.

5. An apparatus as claimed in claim 1, characterized in that the element comprises a sheet member having an arcuate edge provided with teeth, the pivot consisting of a spindle secured to the sheet member, the cassette holder comprises a toothed rack which is in mesh with the arcuate edge of the sheet member, and the cassette holder has a slot engaged by the spindle, a part of the bounding wall of the slot constituting the guide means carrying the spindle.

6. An apparatus as claimed in claim 5, characterized in that the sheet member has the shape of an arc of circle having a center, the spindle is secured to the sheet member at the location of the centre of the circle, and the toothed rack is straight.

7. An apparatus as claimed in claim 5, further comprising a spring having one end secured to the urging means at the location of the pivot and has its other end secured to the cassette holder for returning the urging means, upon removal of the cassette from the holder, in the direction opposite the direction of urging of the sliding cover.

8. An apparatus according to claim 5, wherein the part of the bounding wall of the slot constituting the guide means is straight and extends perpendicularly to the direction of insertion of the cassette.

9. An apparatus as claimed in claim 1, further comprising a spring having one end secured to the urging means at the location of the pivot and its other end secured to the cassette holder for returning the urging means, upon removal of the cassette from the holder, in the direction opposite the direction of urging of the sliding cover.

10. An apparatus for cooperation with a cassette having a housing and a sliding cover which is slidable on the housing, the apparatus comprising:

a cassette holder for receiving the cassette, the cassette being insertable into the cassette holder in a direction of insertion; and means for sliding the sliding cover on the cassette during insertion of the cassette into the cassette holder, said means consisting essentially of
 a) guide means on the cassette holder extending only substantially linearly and only substantially transversely to the direction of insertion, and
 b) an urging member having a first portion with a first end engageable with the sliding cover of the cassette, a second portion extending from said first portion and including a second end, and a pivot between said first and second portions about which said urging member is pivotable and which is slidable in said guide means, and
 c) constraining means for constraining said second end portion such that, as said cassette is inserted into said cassette holder in the insertion direction and said first end engages said sliding cover, said urging member pivots about said pivot and said pivot slides in said guide means substantially transverse to the direction of insertion so that said first end portion slides said sliding cover.

11. An apparatus according to claim 10, wherein said constraining means consists essentially of said holder having a toothed rack and said second end of said urging member having an arcuate toothed portion in mesh with said toothed rack.

12. An apparatus according to claim 10, wherein said constraining means consists of a stop portion of said cassette holder against which said second end of said urging member butts.

13. An apparatus according to claim 10, wherein said constraining means consists of a flexible element securing said second end to said cassette holder.

14. An apparatus according to claim 10, further comprising biasing means for biasing said pivot in said guide means in a direction opposite to its direction of movement during insertion of the cassette.

15. A magnetic tape cassette apparatus for cooperation with a cassette having a housing, a magnetic tape in said housing, and a sliding cover which is slidable on the housing between a rest and an operating position, the apparatus comprising:
 a cassette holder for receiving the cassette, the cassette being insertable into the cassette holder in a direction of insertion; and
 means for sliding the sliding cover from its rest position to its operating position during insertion of the cassette into the cassette holder, said means comprising
 a) guide means on the cassette holder extending linearly and only substantially transversely to the direction of insertion of the magnetic tape cassette,
 b) an urging member having a first portion with a first end engageable with the sliding cover of the cassette, a second portion extending from said first portion and including a second end, and a pivot disposed between said first and second portions about which said urging member is pivotable and which is slidable in said guide means, said urging member being movable between a first position in which said first end engages said sliding cover in its rest position to a second position in which said first end has moved said sliding cover to its operating position, and
 c) constraining means for constraining said second end portion such that, as said cassette is inserted into the cassette in the insertion direction and said first end engages said sliding cover, said urging member pivots about said pivot and said pivot linearly slides in said guide means substantially transverse to the direction of insertion and said first end slides said sliding cover into its operating position.

16. An apparatus according to claim 15, wherein said constraining means comprises said holder having a toothed rack and said second end of said urging member having an arcuate toothed portion in mesh with said toothed rack.

17. An apparatus according to claim 16, wherein said urging member is planar and said pivot is a spindle extending therefrom.

18. An apparatus according to claim 17, wherein said guide means comprises a straight slot in said cassette holder extending perpendicular to the direction of insertion of the cassette.

19. An apparatus according to claim 15, wherein said constraining means comprises a stop portion of said cassette holder against which said second end of said urging member butts.

20. An apparatus according to claim 15, further comprising biasing means for sliding said pivot in said guide means to return said urging member to said first position upon removal of the cassette from said cassette holder.

* * * * *